Figure 1:
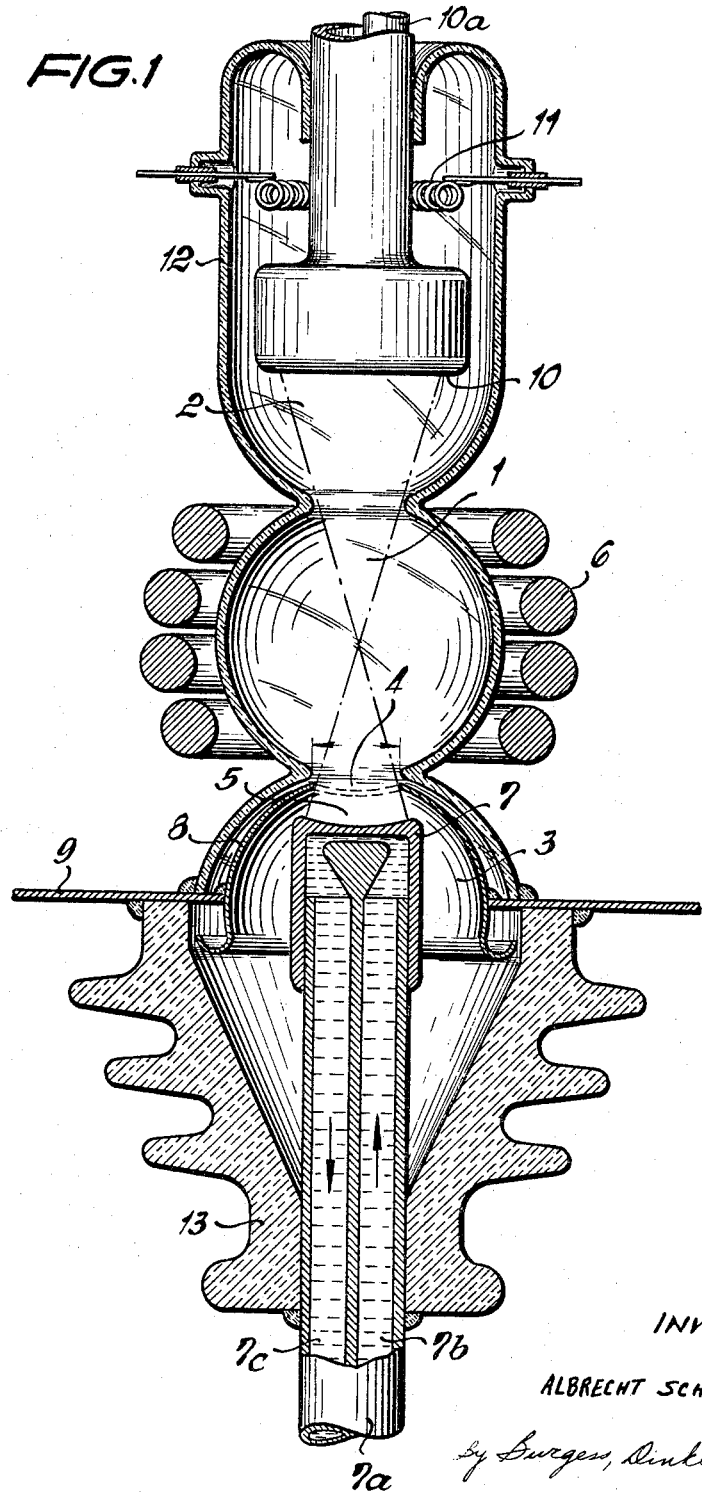

Dec. 17, 1968  A. C. SCHMIDT  3,417,245
NEUTRON GENERATING APPARATUS
Filed April 22, 1963  5 Sheets-Sheet 2

INVENTOR
ALBRECHT SCHMIDT
By
Burgess, Dinklage & Sprung
ATTORNEYS

Dec. 17, 1968  A. C. SCHMIDT  3,417,245
NEUTRON GENERATING APPARATUS

Filed April 22, 1963  5 Sheets-Sheet 3

INVENTOR
ALBRECHT SCHMIDT
By
Burgess, Dinklage & Sprung
ATTORNEYS

INVENTOR
ALBRECHT SCHMIDT
ATTORNEYS

Dec. 17, 1968   A. C. SCHMIDT   3,417,245
NEUTRON GENERATING APPARATUS
Filed April 22, 1963   5 Sheets-Sheet 5
FIG.6
FIG.7
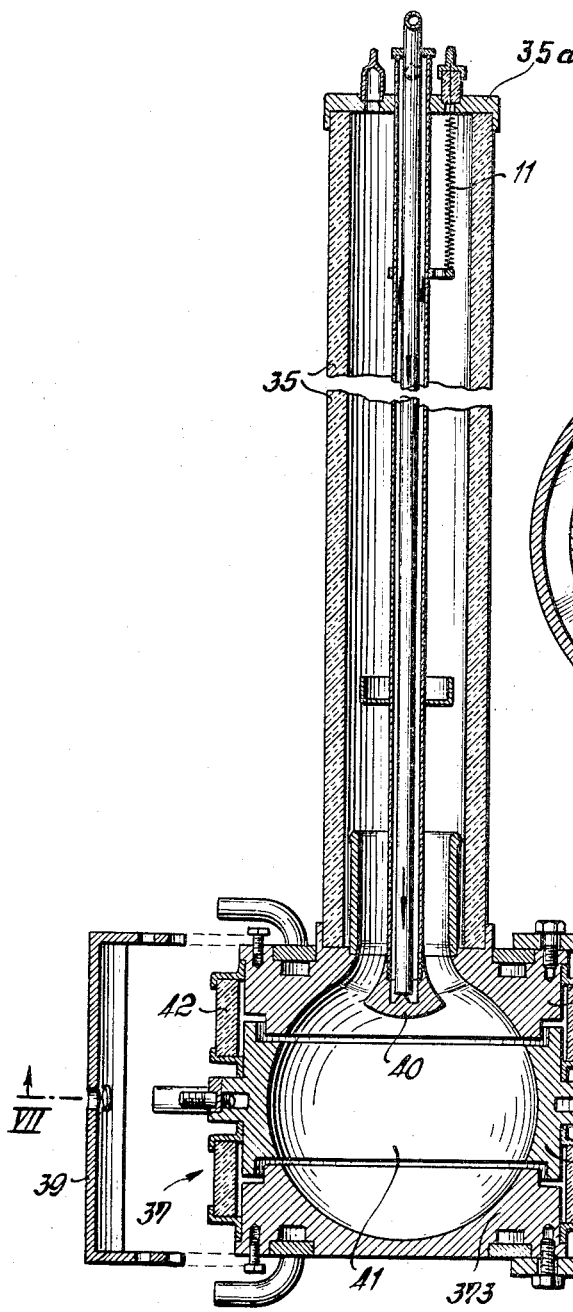
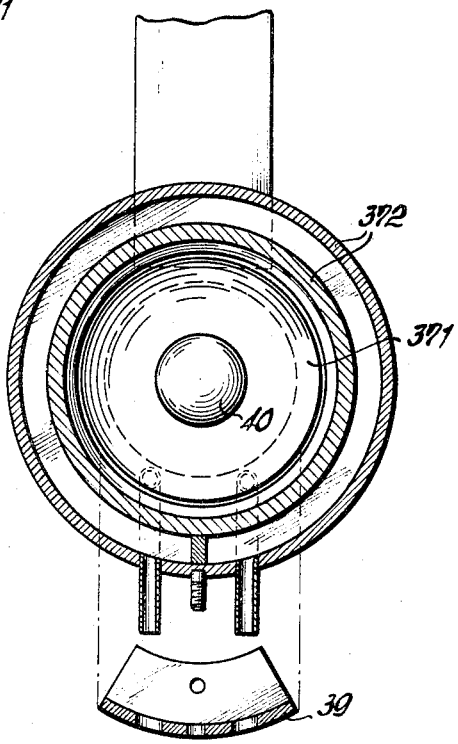
INVENTOR
ALBRECHT SCHMIDT
ATTORNEYS United States Patent Office 3,417,245
Patented Dec. 17, 1968

3,417,245
NEUTRON GENERATING APPARATUS
Albrecht Carl Schmidt, Karlsruhe, Germany, assignor to Gesellschaft fur Kernforschung m.b.H., Karlsruhe, Germany, a corporation of Germany
Filed Apr. 22, 1963, Ser. No. 274,763
9 Claims. (Cl. 250—84.5)

The invention relates to a gas discharge tube, in which ions produced by a high frequency low pressure gas discharge (ion generator) are subsequently accelerated and produce nuclear reactions in a target electrode. The invention more particularly relates to a neutron generating tube, which in pulsed operation would give bursts of neutrons released from the target in utilizing neutron generating nuclear reactions, as for example the fusion reactions of the heavier isotopes of hydrogen.

Non-steady neutron sources which would give high instantaneous peak neutron source strength when operated in a repetitive pulsed manner are required, for example for many measurements with time-varying neutron fields in neutron physics and nuclear technology.

Various devices have been employed for this purpose, as for example electron linear accelerators which generate neutrons utilizing ultra-hard X-rays bremsstrahlung generated by impact of very energetic electrons on a target material of high atomic number. The neutrons are subsequently produced by $(\gamma, n)$-nuclear reactions, as for example of $Be^9$ $(\gamma, n)$ $Be^8$, $H^2$ $(\gamma, n)$ $H^1$, $U^{nat}$ $(\gamma, n)$ $U$, $U^{235}$ $(\gamma, n)$ $U$ at the time the pulsed electron current strikes the target.

Such accelerator plants are, however, very costly, and the ultra-hard X-rays generated are dangerous and very deleterious for many applications and can only be shielded off with great difficulty.

It is also known to operate accelerating plants, such as cascade generators or Van de Graaff generators in a pulsewise manner and to generate neutrons from nuclear reactions caused by accelerated light atomic nuclei while striking the target material. This is usually done by using the reactions such as $D(d, n)$ $He^3$, $T(d, n)$ $He^4$, $Be^9(d, n)$ $B^{10}$. The instantaneous ion beam currents obtainable by way of pulse operation are not susceptible to any substantial increase as compared with the values obtainable in connection with continuous operation owing to the fact that for ion optic reasons and due to the outer insulation of the accelerator tube relatively long ray paths are necessary. Furthermore, the pressure difference as between the ion source and the after-acceleration system must be maintained by a narrow channel diaphragm. Thus, in such plants, when operating in pulse operation, only comparatively slight instantaneous neutron source intensities may be obtained so that the degree of utilization is low even in these rather extensive plants.

Smaller plants have also been developed where both the generation of the ions and the after-acceleration takes place at the same pressure. The reactions which are used in this conection are the $D(d, n)He^3$ and $T(d, n)He^4$ reactions which afford an adequate yield of neutrons even at relatively low acceleration voltages of 100 to 200 kv. The targets of such plants may have a surface which is covered with a thin metal sheath for example zirconium or titanium in which is occluded a high content of deuterium or tritium. The ions are generated in a low-pressure deuterium discharge and the acceleration thereof toward the target is aided by a beam generating system. Since the ions are produced and accelerated in areas of equal pressure contrary to the requirements of Van de Graaff or cascade generators, it is unnecessary to provide a pumping plant in order to maintain a pressure difference as between the ion-generating gas discharge volume and the high vacuum after acceleration span. Therefore the system can be operated as a vacuum-tight sealed tube. Even with this kind of system, however, it is not possible to produce instantaneous peak ion current intensities of more than several hundred milli-amperes with pulse operation and to accelerate the same to yield the required energy. While instantaneous neutron source intensities of $10^{12}$ neutrons per second are obtainable at best, the mean source intensities are lower by several orders of magnitude due to the low duty ratio.

One object of this invention is a gas discharge tube which overcomes the above-mentioned disadvantages.

Figure 2:
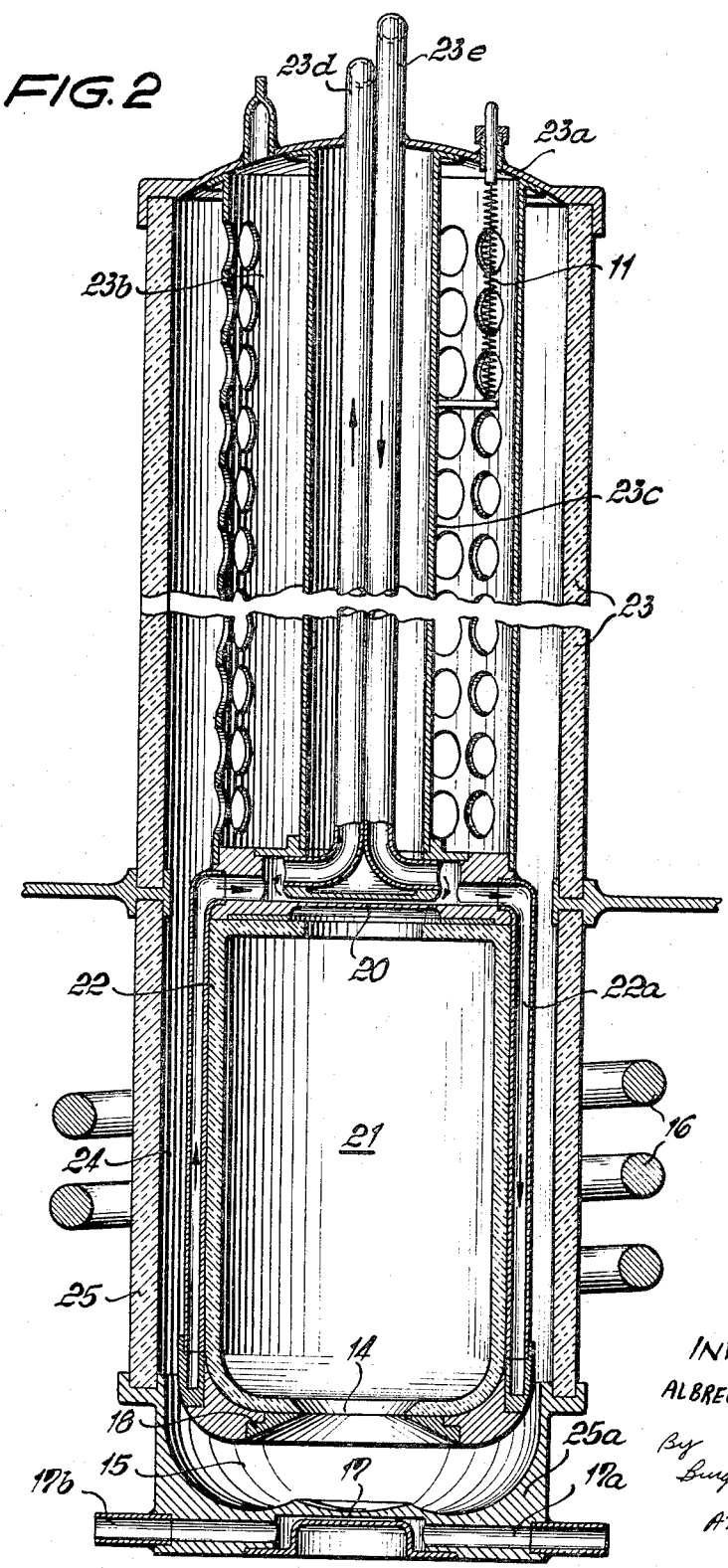
Figure 3:
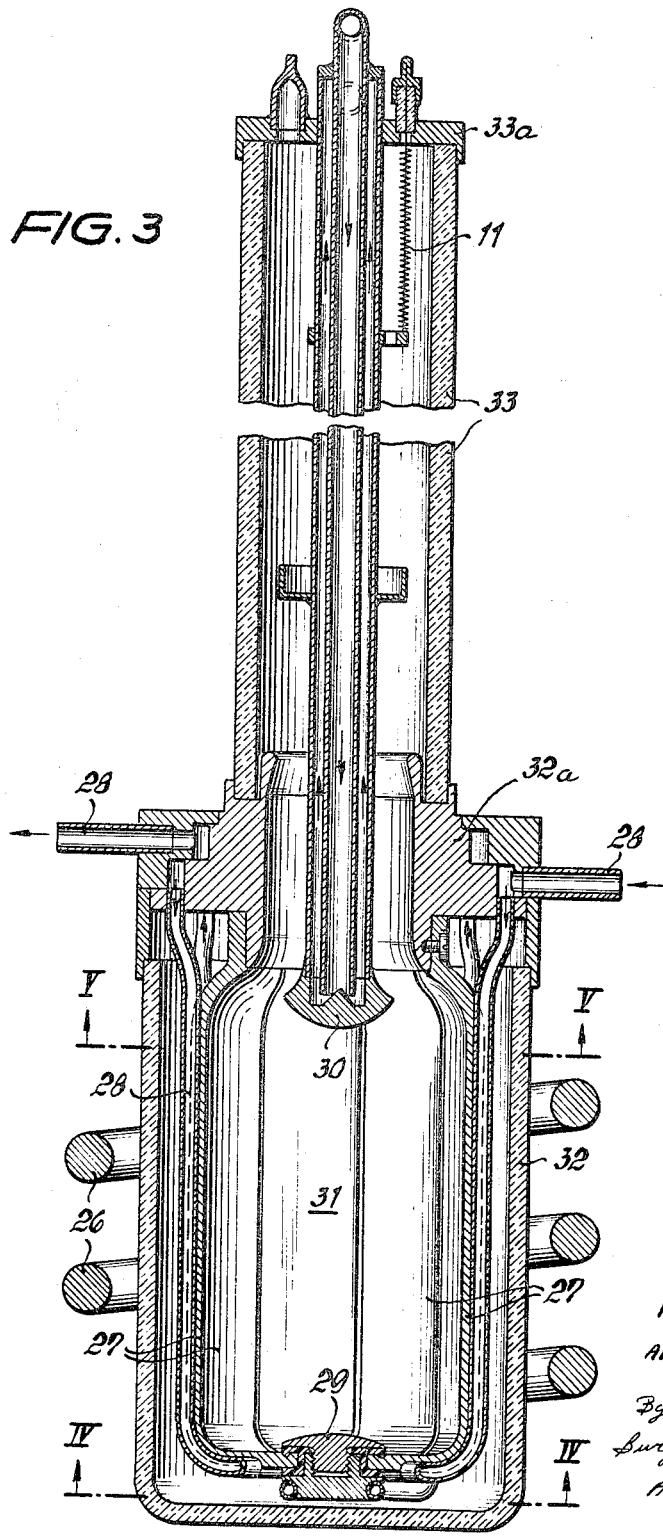
Figure 4:
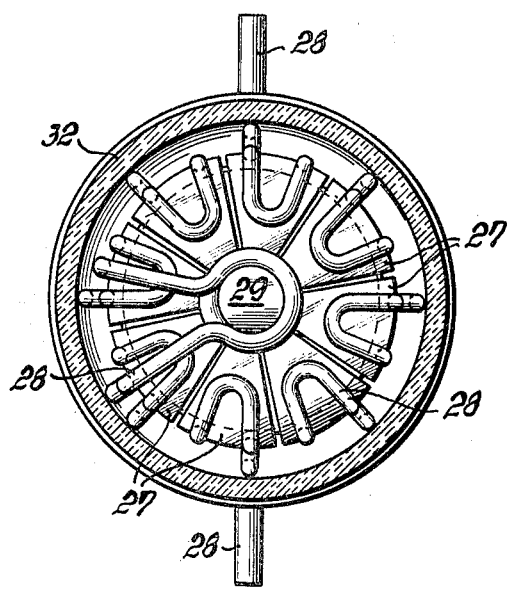
Figure 5:
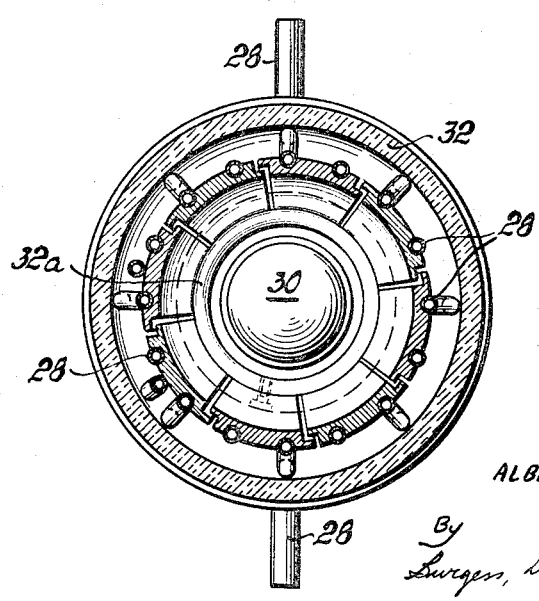

A further object of this invention is a gas discharge tube capable of producing neutron sources of high instantaneous pulsed source intensity at a relatively low cost and which is capable of being operated as a sealed neutron flash tube and which also affords high average source intensities. These and still further objects will become apparent from the following description read in conjunction with the drawings in which:

FIG. 1 is a diagrammatic vertical section of an embodiment of a discharge tube in accordance with the invention, FIG. 2 is a diagrammatic vertical section of a still further embodiment of a tube in accordance with the invention, FIG. 3 is a diagrammatic vertical section of a still further embodiment of a tube in accordance with the invention, FIG. 4 is a cross-section of the embodiment shown in FIG. 3, FIG. 5 is a further cross-section of the embodiment shown in FIG. 3, FIG. 6 is a diagrammatic vertical section of still a further embodiment of a device in accordance with the invention, and FIG. 7 is a cross-section of the embodiment shown in FIG. 6.

The invention is therefore based on the consideration that higher voltages may be maintained between closely adjacent electrodes without any breakdown if the free paths of electrons emitted from the negative electrode, for example by ion impact, exceed the distances between the electrodes, since no self-maintained discharge can then develop.

The gas discharge tube in accordance with the invention comprises a casing containing gas under low pressure. High frequency coupling means, as for example, a coil is provided for converting a portion of the gas into a plasma with a free plasma boundary by applying high frequency energy to the coil. A cathode target is positioned adjacent the plasma boundary and an anode is provided opposite to the target on the other side of the plasma volume. Means are provided for applying an electrical potential difference between the positive anode and the negative target, as for example, a pulsed voltage, to thereby generate an ion beam from the plasma boundary against the target. The target is positioned at a distance from the plasma boundary, not greater than twice the diameter of the ion beam before striking the target and preferably less than the diameter of the ion beam before striking the target. A diaphragm electrode may preferably be positioned in front of the target which is operated at the positive anode potential to control the plasma boundary.

The target preferably contains material capable of generating neutrons upon being struck by the ion beam as for example deuterium or tritium, as for example occluded by zirconium or titanium. The gas in the casing preferably contains deuterium and/or tritium.

The construction in accordance with the invention allows the maintaining of very short accelerating paths for high ionic currents which are capable of being operated at the same pressure as the low pressure discharge.

With a positioning of the target at a short distance from the plasma boundary and/or the diaphragm electrode, the electrons released from the target by the ion bombardment have no chance to cause ionizing impacts on their path to the plasma boundary or the positive diaphragm electrode, due to the low operating gas pressure. Therefore, no self-maintained discharge can develop in front of the target electrode respectively in the accelerating gap, so that high pulsed acceleration voltages will be applicable. On the other hand at the same low pressure a high-frequency discharge in the ion generating discharge vessel easily can be exited.

The construction allows the production of non-steady neutron sources of high instantaneous source intensity which are capable of being operated as sealed neutron flash tubes and which also, because of a relatively high duty ratio, provide high average source intensities.

Referring to the embodiment shown in FIG. 1, a casing, the interior of which may be maintained under low gas pressure, is formed from the wall 12 of glass, ceramic, or the like and the insulator 13 of similar or other insulating materials. The casing is shaped to define an anode chamber 2 at one end, an acceleration or target chamber 3 at the opposite end, and a central spherical discharge chamber 1. An anode 10 is positioned in the anode chamber 2 and the current lead-in for this anode extends through the end of the wall 12 forming a pressure-tight seal therewith. Also positioned in the anode chamber 2 is the gas supply coil 11 which consists, for example, of titanium or zirconium wires which may be resistant heated by means of the electrical leads which extend through the wall 12 in contact therewith and which may contain deuterium and tritium gas. The discharge chamber 1 is preferably electrode free and surrounded by the high frequency coil 6.

A target 7, having a concave target face, is positioned in the target or acceleration chamber 3 mounted on the lead-in rod 7a which extends in a gas-tight manner through the insulator 13. The lead-in rod 7a serves the purpose of supplying the negative accelerating potential to the target 7 and is provided with cooling passages 7b and 7c for liquid cooling the target 7.

Also positioned in the target or acceleration chamber 3 is the diaphragm 8 which is mounted on the metal lead-in 9 to which the wall 12 and insulator 13 are joined in a pressure-tight manner. The diaphragm 8 has a central circular diaphragm opening in front of the target 7 and between the discharge chamber 1 and acceleration chamber 3.

The casing is maintained under vacuum and contains a gas under low pressure as for example a mixture of deuterium and tritium and may be vacuum sealed or connected to a pump by means of the connection 10a which extends into the anode space and is in communication with the interior of the casing.

Alternately, or additionally, the desired pressure may be maintained within the casing by means of the gas supply coil 11. Thus, deuterium and tritium gas may be stored in this coil of titanium or zirconium wires and controllably in a reversible manner released by electric heating of the wires. When operating in this manner, it is not necessary to have a pump connection, and the casing may simply be vacuum-sealed.

In operation a high frequency current, as for example with a frequency in the range between 10 and 100 megacycles per second is passed through the coil 6 causing conversion of the gas in the discharge chamber 1 to plasma in the manner of a conventional high frequency, low pressure discharge ion generator. The generation of the plasma in this manner is preferable, since it can be effected even at very low pressures and metal electrodes are not required within the discharge chamber which acts as a plasma chamber. With the use of the electrode-free discharge or plasma chamber, the probability of recombination on metal electrodes is eliminated, and the losses which would occur due to cathode heating or the like are eliminated. The ring currents in the plasma obtainable through the high frequency discharge are several times higher than those of normal non-self-sustaining low pressure discharges, the currents of which are substantially limited by the emission capacity of the cathodes.

The boundary of the plasma formed at the walls of the discharge chamber 1 continues at the diaphragm 8 forming a free plasma boundary there and is shown in the drawing at 4. The target 7 is preferably liquid cooled, as for example, by passing cooling water through the passage 7b. Voltage is applied to the target 7 so the same is at negative potential with respect to the anode 10 and an ion beam is generated from the plasma boundary against the target 7. In accordance with the invention, the distance of the target 7 from the plasma boundary should not be greater than twice the diameter and preferably less than the diameter that the ion beam represented at 5 has just before striking the target 7. The striking of the ion beam against the target may be used for producing a nuclear reaction as for example the generation of neutrons as for example from the $T(d, n)$ $H_4$ reaction. For this reaction, for example, it is preferable that the casing contain a mixture of deuterium and tritium while using a high vacuum sealed tube. This can be done either with a common supply unit or with separate supply coils for the two gases initially. Impoverishment of the target layer can safely be prevented since both tritium, as well as deuterium, are used for the ionic bombardment of the target, and these materials adhere to the target and thus may be further used as target nuclei. In this case the load of the target layer can be boosted under certain conditions since the target nuclei content achieves a stationary equilibrium value.

The path of the accelerating ion beam 5 is limited by the space charge and is diverent, not being focused on the target and thus assuring the uniformly high load on the target layer.

The bombardment of the target layer with the ion beam also causes the release of secondary electrons. These secondary electrons are initially slow, and are therefore accelerated up to the plasma edge in a practically rectilinear manner along the acceleration path of the ion beam but in the opposite direction. By virtue of their high energy these electrons pass through the plasma almost unhindered discharging all their energy on the anode. They move within the cone indicated by the broken line between the target 7 and anode 10. The anode 10 should preferably have a sufficiently large surface so as to be able to capture the entire cross-section of the secondary electron flow issuing from the target, i.e. should have a surface area greater than the maximum cross-sectional area of this flow. A second family of slow electrons, corresponding to the ion beam drawn along the acceleration path from the plasma is diffused from the plasma in the discharge chamber 1 to the anode 10. This family, however, owning to its low energy, contributes very little to the load on the anode. As shown, the casing 12 is constricted between the anode and discharge chambers. This constriction should, however, be wider than the periphery of the path of the secondary electrons so that these electrons can pass through the constriction without contacting the walls 12.

The discharge chamber 1, as shown, has a spherical shape which is advantageous inasmuch as the discharge losses are proportional to the surface area. The radius is determined by the gas pressure and ignition conditions. After the ignition, the radius of the vessel determines the electron temperature whereas a boost of the high frequency power augments the plasma density.

In order to achieve a uniform field over the circular emission aperture as defined by the diaphragm 8, the surface of the target 7 should preferably have a concave curvature as shown which is parallel to the convex curvature of the plasma boundary 4. The center of the plasma boundary and the target should preferably lie along the axis of the discharge chamber 1. The diaphragm electrode 8 which extends along the outer wall of the target or accelerator chamber 3 assures a defined field distribution along the edge of the ion beam and on the outside. The emission aperture confines the beam's edge on the boundary of the plasma. At that point the diaphragm electrode and the edge of the beam should preferably form an angle of 67.5 degrees and due to its design in conjunction with the target assures matching of the potential of the interior containing the space charge to the outer region of the acceleration chamber which is free of a space charge. The beam's edge is thus perpendicular to the equal potential surfaces.

The setting of the optimum curvature of the plasma boundary takes place by regulation of transmitter power. The form of the plasma boundary is determined by the conditions of equilibrium between ion diffusion current density on the side of the quasi neutral plasma which is equal to the ion emission density and the density of the ion flow in the space charge potential of the acceleration gap 5. The ion diffusion current in the discharge vessel is oriented radially outward in consequence of the radial plasma density gradient from the center of the discharge whereby the ions, owing to slight gas pressure, clear the plasma potential from their generating site in the radial direction practically unobstructed and strike the wall or abandon the quasi neutral plasma on the plasma boundary in the emission aperture to accelerate along the acceleration path radially toward the target.

Since voltages, for example, in excess of 100 kv. are required for the production of neutrons in the case of nuclear reactions with deuterons, the field intensity or the collector gradient becomes very high in the case of the short acceleration path in accordance with the invention, and it presupposes a very high ion emission current density on the ion-emitting plasma boundary layer, this density being given by the plasma-electron temperature and the ion density in the plasma. Thus, a low pressure discharge of relatively high ionization level is required for the production of ions. Owing to unavoidable wall losses of the discharge chamber, a proper low pressure discharge calls for an appropriate high frequency power supply as a preliminary condition. The high emission current densities in conjunction with high voltage, i.e. acceleration voltages greater than 100 kv., are responsible for an appreciable load on the target. The secondary electron quantity released from the target, on the striking of the ions, causes an anode load which exceeds several fold the load of the target electrode. Such a system could hardly tolerate such a thermal load under stationary conditions. It is, therefore, of particular advantage to operate the system pulsed in a manner known per se whereby both the high frequency field and the high anode voltage are intermittently generated in a pulse-like manner. This intermittent operation calls for a high efficiency, high frequency generator, capable of producing in short impulse durations of about $10^{-5}$ seconds about $10^4$ to $10^5$ watts.

The frequency of the high frequency energy to charge the coil 6 is governed by the conditions necessary to cause the optimum ignition onset of the discharge and as mentioned is preferably in the range of 10–100 megacycles per second. It is preferable to have the discharge chamber mounted directly in the tank circuit of a pulsed oscillator RF generator inasmuch as the load changes occur on the ignition with each impulse and are apt to have the effect of appreciably detuning the circuit. The plasma with a high ionization level constitutes a secondary winding of very low resistance coupled with the oscillator circuit. The high frequency energy flow from the coil permeates only into the boundary regions of the plasma while the inner space of the plasma is practically devoid of any field owing to the high conductivity. Under these conditions, the directed circumferential ring current component in the plasma corresponds to the over-all current flowing across the high frequency coil windings.

Following the ignition, a peak ionization is achieved within a few microseconds. It is preferable for the transmitter to be excited by a triangular excitation pulse which causes a continuous build up of the oscillator circuit and makes feasible the uniform heating of the plasma to a high temperature attended by a lower load of the transmitter tubes than is obtained in the case of a rectangular impulse.

At the time of maximum plasma density, the negative extremely high voltage impulse, (EHT, i.e. extremely high-tension), is impressed on the target 7. The duration of the EHT-accelerating voltage pulse is best determined by the admissible instantaneous load of the surface of the target which is coated with the target material as for example tritium combined with the titanium for the production of neutrons. In doing this, care must be taken to avoid excessive instantaneous temperature boosts occuring on the active surface which is only a few microns thick since this would disrupt the absorption of the target gas which is strongly affected by the temperature. It is, therefore, most advantageous to construct the target of a highly thermo-conductive material and to provide a highly efficient cooling. The maximum pulse recurrence frequency is furthermore governed by the mean power that can be tolerated by the cooling system or the systems of the target and the anode. Similarly, attention must be paid to the temperature of the casing, and it is preferable to cool the same with an intense air flow, as for example from a ventilator.

The EHT-accelerating voltage pulse should be as rectangular as possible in form so as to reduce the useless load of the target during the time of the pulse edges. It is advisable to mount the EHT-pulse transformer as close as possible to the discharge tube and the insulation of the voltage supply line should be matched with the high voltage transformer so as to avoid injurious capacitances.

The X-rays generated by the parts struck by the fast secondary electrons, and in particular the anode, may be kept at a minimum by constructing these parts of a material having a low atomic number as for example Be or graphite.

The embodiment shown in FIG. 2 is provided with a vacuum-tight casing formed of the two cylindrical ceramic-type sections 23 and 25 joined together in a pressure-tight manner. The pipe section 23 has the metallic cap 23a joined thereto and the pipe section 25 has the metallic target-carrying bottom closure 25a connected thereto in a pressure-tight manner.

Suspended in the lower portion of the casing is the open-ended vessel 22 constructed of ceramic stock which defines the discharge chamber 21. The vessel 22 is spaced from the wall 25 to leave the insulation space 24. The vessel 22 is suspended from the cover 23a by means of the perforated cylindrical sleeve 23b. Concentrically positioned within the sleeve 23b is the cylindrical metallic sleeve 23c and positioned within the sleeve 23c are the cooling liquid pipes 23d and 23e respectively. Positioned above the upper opening in the vessel 22 is the anode 20 and the cooling pipe 22a leads to a ring in which is inserted the diaphragm 18 at the lower opening of the vessel 22. This diaphragm electrode 18 defines the emission aperture 14. Positioned below the emission aperture 14 in the bottom section 25a is the target 17 which is cooled by means of the cooling passages 17a, 17b. A high frequency coil 16 surrounds the discharge chamber 21. A coil of titanium or zirconium wire 11, containing gas such as deuterium and tritium, may be electrically heated in order to control the gas pressure in the casing.

In operation the casing is maintained under vacuum in the same manner as the embodiment described in FIG. 1; the plasma is formed in the discharge chamber 21 by means of the high frequency field generated by the high frequency coil 16 and the plasma boundary controlled by the diaphragm 18 is formed at 14. The target 17 is maintained at ground and a high positive voltage is supplied to the anode 20 through the cap 23. The ion beam discharges from the plasma boundary at 14 against the target 17 causing the nuclear reaction, as for example the generation of neutrons, as for example from tritium, on the target. Overheating of the target is prevented by passing a cooling liquid, such as water, through the passage 17a, around the target, and out through the passage 17b, and the anode and remainder of the system is prevented from overheating by passing a cooling liquid, such as water, in through the pipe 23a, whereupon the same passes around the anode 20, through the pipes 22a and out through the pipe 23b.

By providing the target 17 at the end of the device and operating the same at ground potential, the neutrons generated from the target layer may be conveniently utilized and brought closer to the material to be irradiated therewith, allowing a larger useful solid angle of neutron radiation.

In this embodiment, the anode 20 is acted upon with positive pulses, and since the potential of the plasma which is excited by high frequency energy always follows the positive potential of the anode 20, the discharge chamber 21 and the plasma volume, as well as the diaphragm 18, which all together are operated at anode 20 potential, being insulated from ground potential. This is achieved by means of the insulating space 24. The plasma generated in the interior chamber 22 is confined by its wall and thus does not penetrate into the insulating space 24. The gap between the outer vacuum casing 25 and the outer jacket of the vessel 22 should be so dimensioned that no discharge is generated in the insulating space 24 by means of the high frequency coil 16. Furthermore, this space is constructed small enough for the ratio between the volume and the surface of the insulating space to be lower than it is for the interior of the discharge chamber 21, and thus the plasma volume contained therein. Thus, the insulation space 24, which operates at the same pressure as the plasma chamber 21, becomes an insulating space for the acceleration high potential. On the other hand, the high frequency energy coupled in from the coil 16 permeates the vacuum casing of the insulating space 24 and the vessel 22, exciting only the plasma inside the volume defined by the discharge chamber 21. Following the buildup of the plasma by the high frequency energy, the common potential of the anode 20 of the plasma in the chamber 21 and of the diaphragm electrode 18 can be raised to the positive acceleration high voltage. The positive ions permeate the emission aperture 14 in the diaphragm 18 and are thereupon accelerated along the ensuing acceleration path 15 towards the target 17 to produce the nuclear reaction at the latter point. The diaphragm electrode 18 and the target electrode 17 can be so formed that by potential matching the beam edge of the accelerated ion beam along the path 15 assumes the highest degree of rectilinearity. The secondary electrons released on the target by the impact of ions are then accelerated in the opposite direction through the diaphragm aperture 14 and routed to the anode 20. The two metal pipes 22a which channel the coolant from the anode to the diaphragm 18 and run along the outer side of the vessel 22 will not affect the high frequency field of the coil 16 since they run perpendicular to the coil field and only the lengthwise electrical field of the coil for the plasma chamber 21 is partially influenced. Similarly, the toroidal voltage induced by the alternating magnetic field is unaffected. The distance from the plasma boundary formed at 14 to the target 17 is less than twice the diameter, preferably less than the diameter, that the ion beam has just prior to striking the target 17.

As compared with the known cascade accelerators, the gas discharge tube in accordance with the invention in addition to a much lower consumption affords further advantages in that it admits ion impulse currents of several amps. and does not require a long focusing accelerating path. The mean load of the system in accordance with the invention is, however, fully compatible to the load capacity of the cascade accelerators and similar to their load ability, and it is governed primarily by the maximum permissible load of the target electrode 17.

Compared with other known types of non-steady plants, the construction in accordance with the invention has the advantage that the plasma does not rebound from the target which makes longer impulse durations possible.

The novel operation of the device in accordance with the invention may be summarized as follows:

During the period following the initiation of the high frequency power pulses and upon the ignition of the discharge, the plasma gushes out from the emission aperture, and upon the imposing of the pulsed acceleration EHT and specifically during the incidence of the surge front of the EHT-pulse, it recedes only to a predetermined position in the diaphragm aperture. The plasma boundary from which the ion emission occurs is thus positioned so that its edge is at the diaphragm electrode. The curvature of the plasma boundary can be set at an optimum value by a suitable selection of the high frequency power, and thereupon remain stationary throughout the entire duration of the constant accelerating pulse voltage. Prevailing during this period are predetermined and optimum conditions in the beam guidance which conditions may be designated as "electrically stationary." This makes it feasible to obtain momentary ionic currents of the order of magnitude of 20 amps for pulse durations of a few microseconds. In the case of acceleration voltages of 200 kv., for example, in the T $(d, n)$ reaction where tritium targets are used, instantaneous neutron source intensities of about $10^{15}$ sec.$^1$, or yields of about $10^9$ neutrons per pulse will be obtained.

If these high neutron yields are desired with appreciably shorter pulse durations, it becomes necessary to accordingly boost the instantaneous ionic currents. The ultimate magnitude of the boosts permissible is, however, limited by the ionization density which occurs adjacent the plasma boundary.

In accordance with a further embodiment of the invention, this difficulty is eliminated, and a construction which permits extremely high ionic currents is achieved by omitting the assumption of an approximately defined plasma boundary.

In accordance with this construction, the target is so constructed so as to actually surround and form the discharge chamber with the anode accessible at one end thereof or extending therein. The target is preferably of segmented sections collectively forming the discharge chamber of, for example cylindrical or spherical shape with the anode extending in at one end thereof. The chamber which is formed by the target electrodes is preferably completely enclosed save for one aperture for the anode.

It is most advantageous to segment the target in such a manner that the individual target parts may serve for the supply of high frequency energy. With such a construction, it becomes feasible to obtain when operating with very short pulses extremely high ionic currents exceeding those otherwise obtainable by a number of orders of magnitude. This is possible, since, in accordance with this embodiment, almost the entire surface of the plasma is utilized for the emission of ions and during the time span of a high voltage pulse, the ion beam carries more ions away from the plasma than can possibly be replenished instantaneously from the discharge so that an ionic current of the corresponding level can be achieved. With the aid of a high power, pulsed high frequency, low-pressure discharge, a discharge plasma of a relatively high ionization level is again produced within a few microseconds, and then the positive high voltage pulse is impressed on the anode. This high voltage pulse continues long enough for at least a portion of the ions generated by the discharge to become so accelerated toward the wall of the discharge chamber which constitutes the target and which is under ground potential that neutron generating nuclear reactions are triggered on the target stock mounted on this wall.

One type of design in accordance with this embodiment is the generating of neutrons from the $T(d, n)$ $He^4$ reaction as shown in FIGS. 3, 4, and 5.

The vacuum casing is formed by the vessel 32 and the cylindrical sleeve 33 of ceramic, glass, or the like, which are connected together in a gas-tight manner by the intermediate metallic member 32a and by the provision of the gas-tight cap 33a.

A cylindrical vessel forming the discharge space 31 is concentrically positioned within this casing. This cylindrical vessel is collectively formed by the metal target electrode segments 27. These segments are so fitted together, forming the cylindrical jacket, that the same is provided with multiple slots and a radially slotted floor as may best be seen from FIGS. 4 and 5. The target electrodes 27 have target stock lining the inner surface thereof, as for example containing tritium occluded in titanium. The discharge chamber 31 formed from the target electrodes 27 is completely closed except for the opening at its upper end into which extends the anode electrode 30, the upper tubular portion of which extends concentrically within the sleeve 33. The member 32a which joins the vessel 32 and sleeve 33 together in a vacuum-tight manner is in the form of a flange which holds the upper ends of the target segments 27 peripherally surrounding the anode 30. The upper ends of the target segments 27 are, for example riveted to the flange 32a.

The opposite ends, i.e. the lower ends of the target electrode segments 27, are coupled together by means of a ceramically insulated bolt 29 which, in turn, supports a metal plate covering the center of the slotted floor of the cylindrical jacket formed from the segments 27. The target arrangement and the connected parts are liquid cooled by means of the cooling pipe arrangement 28 with cooling fluids, such as water, flowing therethrough as shown by the arrows. The anode 30 is liquid cooled by the concentric cooling pipe system 30a with cooling liquid being passed through the central pipe and returning out of the peripheral section.

The device is also provided with a gas entrapping wire coil 11 which may be electrically heated in the same manner as the previously described embodiments. A high frequency coil 26 surrounds the discharge chamber 31.

The individual segments 27, which form the target electrode, while the same overlap as shown in FIG. 5, are each separated from one another by an insulation gap. by this subdivision of the target electrode, the same may be inductively coupled to the high frequency field generated by the coil 26.

In operation, the casing, as in connection with the previous embodiments, is maintained under low pressure with a gas, such as mixture of deuterium and tritium. The high frequency coil 26 is excited using, for example, a high power pulsed, high-frequency generator. The current distribution induced in the electrode 27 will produce a plasma as for example deuterium plasma in the discharge chamber 31 with a high ionization level. At the moment of maximum ionization of the plasma, a high voltage pulse is applied to the anode electrode, as for example by the discharge of a charged high voltage condenser, a high voltage cable section or the like across a spark gap triggered by means of an ignition electrode. The high ionization level plasma follows the potential of the anode very rapidly owing to its high conductivity so that ions are accelerated from the plasma to the target 27 and are able to release neutrons by nuclear reactions in the target.

It is desirable to continuously apply a comparatively low power, high frequency current to the coil 26 in the time lapse between the power pulses so that a low, predischarge of a low ionization level is maintained at all times and the extra power which would be necessary to initiate the onset of the ionization with each pulse is not required.

As the ion discharge occurs from substantially the entire plasma surface within discharge chamber 31 to the closely adjacent target, the distance of this area in the plasma from the adjacent portion of the target is in effect substantially less than twice the diameter of the ion beam as it strikes the target.

The embodiment as shown in FIGS. 6 and 7 is similar to that shown in FIGS. 3, 4, and 5 except that the discharge chamber 41 is a spherical chamber formed from the target electrode 37 which is composed of the three spherical segments 371, 372, and 373, which are mutually insulated by means of the ceramic cylindrical pieces 42 which seal the segments into a gas-tight unit, which forms with the cylindrical sleeve 35 of ceramic material and its cover 35a, a vacuum casing. An anode 40 is positioned in the upper portion of the discharge chamber 41 extending through the cover 35a and sleeve 35 into the only opening provided into the chamber 41 through the top of the segment 371. The anode 40 is provided with concentric pipes 40a for cooling liquid in the same manner as the embodiment shown in FIG. 3 and the segments 371, 372, and 373 are provided with peripheral cooling passages 371a, 372a, and 373a respectively for cooling liquid.

Operation is similar to that described in connection with FIGS. 3, 4, and 5. The high frequency current, however, is preferably directly coupled to the segments 371, 372, 373, as for example by providing the high frequency feed in push pull across the electrodes 371, 373, while maintaining the electrode 372 at zero potential. A predominantly inductive coupling of the high frequency energy is obtained when the three electrodes 371, 372, and 373 are short-circuited at one end by means of an electrical bridge 39 while a high frequency current is supplied at the opposite end to the electrodes 371 and 373 in push-pull. Optimum excitation conditions of the discharge may be obtained by means of an intermediate form of these two arrangements. The high frequency energy generates a plasma within the chamber 41 and the anode 40 is pulsed with a high voltage. Since the segments 371, 372, and 373 are connected with each other by means of the high frequency circuit, the same are under identical potential with respect to the acceleration voltage applied to the anode. With the application of this acceleration voltage, ion beam is generated from the plasma against the target initiating the nuclear reaction thereon. The distance between the area where the ion beam is generated in the plasma to the adjacent target wall is in effect substantially smaller than twice the beam diameter as it strikes the target.

The positive high voltage pulse in the foregoing embodiments is only applied to the plasma when the high ionization level of the plasma has been built up by means of the pulsed high frequency energy.

The prescribed time and space conditions for the constructions in accordance with the invention do not permit any disruption of the pulsed acceleration high voltage across the electrodes so that during the adopted pulse duration high instantaneous ionic beams with a defined energy can be generated by optimum adjustment of the high frequency power and are capable of being employed for the purpose of producing high instantaneous neutron source intensities.

The various embodiments of the invention shown in the drawings and the data given refer to tubes where the diameter of the spherical or cylindrical discharge vessel is about 10 cm., but it is possible to choose greater or smaller diameters whereas the HF-power has to be increased or reduced accordingly to the total surface area of the discharge vessels, also the applied gas pressure has to be changed proportional to the chosen diameter. By this means the ion emission density is kept constant for various diameters.

The outstanding results with the discharge tube according to the invention are based on the acknowledgment, that the chosen small acceleration gap distance prevents a self-sustained breakdown to the target electrode from the diaphragm or the discharge vessel. By the same means extremely high ion current densities within the formed ion beam are achieved, which cause the correspondingly high neutron source strengths upon the initiated nuclear reactions. According to the invention it is possible without difficulties to control these high currents by using pulsed operation of the system.

The results obtainable with the use of the gas discharge tubes in accordance with the invention are fully comparable with those obtained from conventional cascade accelerators, but surpass the results obtained with the conventional cascade accelerators by several orders of magnitude in intermittent operation. The yields obtained with the devices in accordance with the invention approximate the instantaneous yields of the linear electron accelerators in the application range of the pulsed neutron sources without the adverse feature of the generation of high intensity ultra-hard X-rays. The devices in accordance with the invention are furthermore of greater simplicity and design and more reliable in operation.

While the invention has been described with reference to certain embodiments, various changes and modifications which fall within the spirit of the invention will become apparent to the skilled artisan. The invention, therefore, is only intended to be limited by the appended claims or their equivalents wherein I have endeavored to claim all inherent novelty.

I claim:

1. A neutron generating apparatus comprising:
   (a) A sealed casing for containing a gas under low pressure;
   (b) An electrically heatable wire disposed within said casing for releasing a gas including at least one isotope of hydrogen, such gas being occluded in said wire for release upon the heating thereof;
   (c) Means for applying high frequency electromagnetic energy to such released gas to convert a portion thereof into a plasma having a predetermined boundary;
   (d) A target electrode disposed within said casing, said target including a plurality of segments defining a chamber for substantially containing the plasma, said target being disposed in predetermined spaced relation to the boundary of said plasma, said target having an exposed surface of material capable of occluding a quantity of such released gas;
   (e) an anode electrode disposed within said casing for extension into said plasma chamber; and
   (f) Voltage pulse generating means operatively connected to said target and anode electrodes for applying an electric potential difference therebetween to generate and accelerate a beam of ions flowing from the plasma boundary and striking the target whereby the impact of said ions produces nuclear reactions in the target material to generate neutrons.

2. The neutron generating apparatus of claim 1 wherein:
   (a) The plasma chamber defined by the segmented target is substantially cylindrical; and
   (b) The means for applying high frequency electromagnetic energy to convert the gas within the casing into a plasma includes a coil surrounding a portion of the exterior of said casing.

3. The neutron generating apparatus of claim 1 wherein:
   (a) The plasma chamber defined by the segmented target is substantially spherical; and
   (b) The means for applying high frequency electromagnetic energy to convert the gas within the casing into a plasma includes the target segments, said segments being directly coupled to a source of high frequency electromagetic energy.

4. A neutron generating apparatus comprising:
   (a) A casing containing a gas under low pressure;
   (b) Means for applying high frequency electromagnetic energy to said gas so as to convert a portion thereof into a plasma having a predetermined boundary;
   (c) A target electrode disposed within said casing, said target being composed of a plurality of segments which form a chamber for substantially containing the plasma;
   (d) An anode electrode, also disposed within said casing to extend into said plasma chamber;
   (e) Means for applying an electric potential difference between said target and said anode to thereby generate and accelerate a beam of ions flowing from the plasma boundary and striking the target whereby the impact of said ions produces nuclear reactions in the target material to generate neutrons.

5. The neutron generating apparatus according to claim 4 wherein the casing is sealed and an electrically heated wire containing the gas for the plasma is disposed within said casing, said gas being occluded in the wire for release therefrom upon the heating thereof.

6. The neutron generating apparatus according to claim 4 wherein the means for applying the electric potential difference between the target and anode is a voltage pulse generating means.

7. A neutron generating apparatus comprising:
   (a) A casing containing a gas under flow pressure;
   (b) Means for applying high frequency electromagnetic energy to said gas to convert a portion thereof to a plasma;
   (c) An anode electrode disposed within said casing;
   (d) A target electrode also disposed within said casing, said target being positioned in adjacent spaced relation to the boundary of said plasma;
   (e) A diaphragm disposed within said casing; positioned in front of the target and adapted to control said plasma boundaries; and
   (f) Means for applying an electric potential difference between said target and said anode to thereby generate and accelerate a beam of ions flowing from the plasma boundary and striking the target whereby the impact of such ions produces nuclear reactions in the target material to generate neutrons, said apparatus being further characterized in that said target is positioned at a distance from the plasma boundary less than twice the diameter of said ion beam before striking the target, wherein said anode plasma and diaphragm are all maintained at substantially the same electrical potential.

8. A neutron generating apparatus comprising:
   (a) A casing containing a gas under flow pressure;
   (b) Means for applying high frequency electromagnetic energy to said gas to convert a portion thereof to a plasma;
   (c) An anode electrode disposed within said casing;
   (d) A target electrode also disposed within said casing, said target being positioned in adjacent spaced relation to the boundary of said plasma;
   (e) A diaphragm disposed within said casing, positioned in front of the target and adapted to control said plasma boundaries; and
   (f) Means for applying an electric potential difference between said target and said anode to thereby generate and accelerate a beam of ions flowing from the plasma boundary and striking the target whereby the impact of such ions produces nuclear reactions in the target material to generate neutrons, said apparatus being further characterized in that said target is positioned at a distance from the plasma boundary less than twice the diameter of said ion beam before striking the target, wherein said diaphragm has an edge defining an aperture and wherein said edge forms an angle of approximately 67.5° with the ion beam passing therethrough.

9. A neutron generating apparatus comprising:
(a) A casing containing a gas under flow pressure;
(b) Means for applying high frequency electromagnetic energy to said gas to convert a portion thereof to a plasma;
(c) An anode electrode disposed within said casing;
(d) A target electrode also disposed within said casing, said target being positioned in adjacent spaced relation to the boundary of said plasma; and
(e) Means for applying an electric potential difference between said target and said anode to thereby generate and accelerate a beam of ions flowing from the plasma boundary and striking the target whereby the impact of such ions produces nuclear reactions in the target material to generate neutrons, said apparatus being further characterized in that said target is positioned at a distance from the plasma boundary less than twice the diameter of said ion beam before striking the target, wherein the casing is shaped to define an anode chamber, a substantially spherical plasma chamber communicating therewith, and an acceleration chamber communicating with said plasma chamber, and wherein the anode is disposed within said anode chamber, with the target being disposed within said acceleration chamber, said target and anode being in substantially coaxial alignment.

References Cited
UNITED STATES PATENTS

| | | | |
|---|---|---|---|
| 2,935,633 | 5/1960 | Peters | 250—84.5 |
| 2,983,820 | 5/1961 | Frentrop | 250—84.5 |
| 2,988,642 | 5/1961 | Soloway | 250—84.5 |
| 2,998,523 | 8/1961 | Muench | 250—84.5 |
| 3,141,975 | 7/1964 | Carr | 250—84.5 |
| 3,185,849 | 5/1965 | Hoyer et al. | 250—84.5 |

ARCHIE R. BORCHELT, *Primary Examiner.*

U.S. Cl. X.R.

313—61

UNITED STATES PATENT OFFICE
CERTIFICATE OF CORRECTION

Patent No. 3,417,245                     December 17, 1968

Albrecht Carl Schmidt

It is certified that error appears in the above identified patent and that said Letters Patent are hereby corrected as shown below:

Column 6, line 59, "and 23c respectively" should read -- and 23e respectively --. Column 8, line 34, "sec. 1" should read -- sec.$^{-1}$ --. Column 12, lines 33 and 56, and Column 13, line 7, "flow pressure", each occurrence, should read -- low pressure --.

Signed and sealed this 21st day of October 1969.

(SEAL)
Attest:

Edward M. Fletcher, Jr.                 WILLIAM E. SCHUYLER, JR.
Attesting Officer                         Commissioner of Patents